United States Patent [19]

Mach

[11] 4,215,376
[45] Jul. 29, 1980

[54] CIRCUIT ARRANGEMENT FOR THE DIGITAL CORRECTION OF TIME BASE ERRORS OF A TELEVISION SIGNAL USING VARIABLE ADDRESSING OF A MEMORY

[75] Inventor: Helmut Mach, Vienna, Austria

[73] Assignee: U.S. Philips Corporation, New York, N.Y.

[21] Appl. No.: 873,733

[22] Filed: Jan. 30, 1978

[30] Foreign Application Priority Data

Feb. 22, 1977 [AT] Austria .................. 1171/77

[51] Int. Cl.$^2$ ............................... H04N 5/04
[52] U.S. Cl. .................... 360/36; 358/148
[58] Field of Search ............ 360/36, 33; 358/8, 4, 358/148

[56] References Cited

U.S. PATENT DOCUMENTS

| | | | |
|---|---|---|---|
| 3,900,885 | 8/1975 | Tallent et al. ............... | 358/8 |
| 4,028,729 | 6/1977 | Browder ...................... | 360/36 X |
| 4,054,921 | 10/1977 | Tatami ....................... | 360/36 X |
| 4,069,499 | 1/1978 | Ninomiya ..................... | 360/36 X |
| 4,081,826 | 3/1978 | Ninomiya ..................... | 360/36 X |
| 4,101,939 | 7/1978 | Owen et al. .................. | 360/36 |

OTHER PUBLICATIONS

Coleman, "A New Technique for Time-Base Stabilization of Video Recorders", Mar. 1971, pp. 29-36, IEEE Transactions on Broadcasting, vol. BC-17, No. 1.

*Primary Examiner*—James W. Moffitt
*Assistant Examiner*—Donald McElheny, Jr.
*Attorney, Agent, or Firm*—Thomas A. Briody; William J. Streeter; Edward W. Goodman

[57] ABSTRACT

In a circuit arrangement for the digital correction of time base errors in a television signal this signal is converted into digital television signals with a certain clock frequency in an analog/digital converter, which signals are consecutively written into the individual addresses of a random access memory (RAM) with the same clock frequency and in the meantime are read from specific addresses of the memory with the same frequency. Which addresses are read depends on the magnitude and sign of the time base error, which is determined in a detection circuit from a comparison signal of the television signal and is converted into digital time base error signals which are quantized with a given time interval, which error signals are applied to an address signal which depending on the number of time intervals, which are defined by the clock frequency, in the time base error signals relative to the number of addresses of the memory controls the selection of the addresses to be read.

5 Claims, 3 Drawing Figures

CIRCUIT ARRANGEMENT FOR THE DIGITAL CORRECTION OF TIME BASE ERRORS OF A TELEVISION SIGNAL USING VARIABLE ADDRESSING OF A MEMORY

BACKGROUND OF THE INVENTION

The invention relates to a circuit arrangement for the digital correction of time base errors of a television signal which is converted into digital television signals by an analog-/digital converter with a specific clock frequency, which for the correction of time base errors are written into and subsequently read from a random access memory device with a given number of addresses, after which they are re-converted into an analog television signal with a digital/analog converter. Such circuit arrangements are for example known from the article "Digital time base correction of video tape recorders" published in the magazine "Monitor Proc. I.R.E.E.", April 1976, pages 118–122. As is described in this article time base errors are corrected by writing the digitized television signal which is afflicted with errors into a random access memory device (RAM) with a variable clock frequency and reading it with a constant clock frequency, the variable clock frequency being formed in dependence upon the instantaneous time base error. Thus digital television signals which are free from time base errors are obtained, which are subsequently re-converted into an analog signal. The maximum time base error which can be corrected by such circuit arrangements is then limited in that the variation of the clock frequency for writing the digital television signals into the memory device cannot be made arbitrarily high in view of the properties thereof. Therefore, rapid larger variations of the time base error, which for example occur owing to phase jumps during the transition from one field to the next field when the television signals which are stored on the record carrier in separate tracks are reproduced, cannot readily be corrected. Such circuit arrangements also exhibit a variable and therefore very annoying minimum residual error, which depends on the control quality, the loop gain of the circuit arrangement, etc. and which can only be kept accordingly small in relation to its fluctuations with comparatively much effort.

SUMMARY OF THE INVENTION

It is an object of the invention to further improved circuit arrangements of the type mentioned in the preamble in respect of their control behaviour for the correction of time base errors. Circuit arrangements in accordance with the invention are therefore characterized in that there is provided an address circuit for the memory device, which writes the digital television signals into the addresses of the memory device with the clock frequency and in between this reads the memory device addresses also with the clock frequency, which addresses have been selected in accordance with the magnitude and sign of the time base error; that there is provided an identification circuit for determining the time base error, which comprises a phase discriminator, to which a comparison signal which has been derived from the television signal is applied, which is compared with a desired signal and then supplies an output signal, which is converted into digital time base error signals which are quantized with a given time interval, the ratio of the time interval which is defined by the clock frequency and the given time interval for the formation of the digital time base error signals being an integer, and that the digital time base error signals are applied to the address circuit, which controls the selection of the memory device addresses to be read depending on the number of time intervals contained in the digital time base error signals and defined by the clock frequency with respect to the number of memory device addresses. Thus, time base errors are corrected in that the digital television signals are read from accurately defined memory-device addresses, the selection of these addresses being dependent on the magnitude and the sign of the time base error. Writing as well as reading of the digital television signals in the memory device addresses is effected with a constant clock frequency. This in particular enables larger time base errors to be corrected as well, because the upper limit for this depends on the storage capacity in conjunction with the clock frequency. A further advantage is that owing to the formation and evaluation of digital time base error signals time error correction is effected on a completely digital basis, so that in contradistinction to the known circuit arrangements described in the introduction, in which analog time base error signals are evaluated, no drift effects occur. Furthermore, a circuit arrangement in accordance with the invention always has a constant minimum residual error, which only depends on the clock frequency for writing the digital television signals into the memory device for reading said signals from the memory device, so that variable time base fluctuations as a result of the residual error, which are experienced as very annoying, are avoided.

It is found to be particularly advantageous when the time interval defined by the clock frequency is an integral multiple, preferably the quadruple, of the given time interval for the formation of the digital time base error signals and a buffer memory is connected to the output of the random of the random access memory, to which buffer memory the digital television signal, which has been read from an address of the memory device, is transferred and in which it remains stored for a certain time, which is determined by the number of given time intervals contained in the digital time base error signals in excess of the time intervals defined by the clock frequency.

Thus, it is possible to further reduce the remaining minimum residual error at a certain clock frequency for writing the digital television signals into the memory device and reading them from the memory device.

Furthermore, it is found to be advantageous when the digital time base error signals are passed through a digital low-pass filter. Thus it is achieved that the digital time base signals are free of RF interference and noise components, which has a favourable effect on the accuracy of the time base error correction.

For a cost-saving embodiment it is found to be advantageous when the memory device comprises at least two random access memories which operate in the multiplex mode, the consecutive digital television signals being alternately written into one of said memories. At a specific clock frequency for the device as a whole it is thus possible to use correspondingly slower memories for the individual memories which are then operated with a lower clock frequency, which memories are substantially cheaper than fast memories, or to use memories with a higher capacity at the same cost, thus enabling proportionally larger time base errors to be corrected.

BRIEF DESCRIPTION OF THE DRAWINGS

The invention is described in more detail hereinafter with reference to the drawing, which shows some embodiments of the invention in block-schematic form, but to which embodiments the invention is not limited.

DETAILED DESCRIPTION

Figure 1:
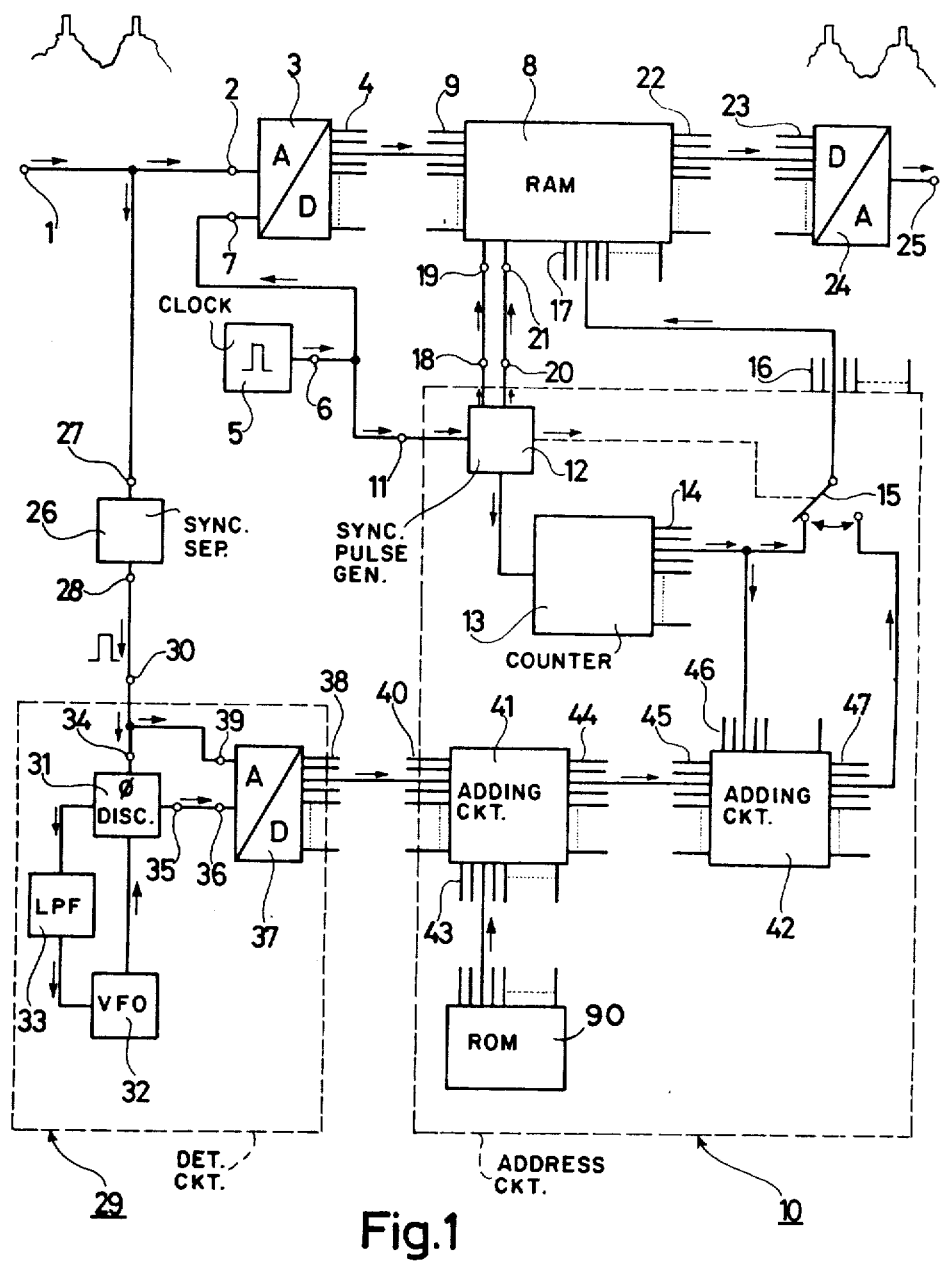
FIG. 1 shows the basic circuit design of a circuit arrangement in accordance with the invention.

In FIG. 1 the reference numeral 1 designates the input of the circuit arrangement for the digital correction of time base errors of a television signal, to which the television signal which is afflicted with errors is applied, which signal is for example supplied by a playback apparatus, which with the aid of magnetic heads scans a magnetic tape on which a television signal is magnetically stored in adjacent tracks and which is destined to be reproduced on the screen of a television receiver. The synchronizing pulses in such a reproduced television signal are generally so unstable, in respect of time, that reproduction on a television receiver is not possible without additional steps, because otherwise there will be fluctuations in the position of the picture. For the correction of such time base errors in a television signal the circuit arrangement which is described hereinafter is employed, which eliminates the time base errors to such an extent that reproduction with a standard television receiver is possible without additional provisions in this receiver.

The television signal applied to the input 1 of the circuit arrangement first reaches the input 2 of an analog/digital converter 3, in which it is converted into digital signals, which are then available at the individual outputs 4 of the converter. The quantization in respect of amplitude of the television signal at the individual sampling instants is then chosen in accordance with the system requirements, which define a specific number of bits. The sampling instants of the television signal are determined in the usual manner with the aid of a pulse-shaped signal with a certain clock frequency, which is supplied by an oscillator 5, from whose output 6 the signal is applied to a further input 7 of the digital/analog converter. In the present embodiment the clock frequency is assumed to be 5 MHz, which on the basis of the sampling theorem corresponds to a frequency bandwidth of the signal of 2.5 MHz, which is quite satisfactory because the television signals supplied by a domestic playback apparatus have a frequency bandwidth of the same order of magnitude. Owing to the choice of this clock frequency the digital signals in accordance with the instantaneous amplitude of the television signal at the sampling instants are available at the outputs 4 of the analog/digital converter every 200 nanoseconds.

These signals are written into the consecutive addresses of the memory device with direct access, which in the present instance is constituted by a single random access memory (briefly RAM) 8, for which purpose the outputs 4 of the converter 3 are connected to the corresponding outputs 9 of the memory 8. Selection of the relevant addresses of the memory 8 in which the digital television signals are to be written, is effected with the aid of address circuit 10, to whose input 11 the signal determining the clock frequency from the oscillator 5 is applied for this purpose. This signal is applied to a synchronizing pulse generator 12, from which the signal of clock frequency is applied to a counter 13, at whose outputs 14 control signals appear which define the addresses in accordance with its count. Via a switch 15 these control signals are applied to outputs 16 of the address circuit, which are connected to corresponding inputs 17 of the memory 8. The actual command for writing a digital television signal into the correspondingly selected address is also derived from the signal of clock frequency, in that an appropriate control signal is applied from the synchronizing pulse generator 12 to an output 18 of the address circuit, which is connected to a corresponding input 19 of the memory 8. The digital signals are now stored in the memory 8 for an accurately defined time interval, compensation of time base errors being possible by an appropriate choice of this time interval, as is to be described hereinafter. This time interval which is governed by the time base error each time defines specific addresses of the memory 8, from which the digital television signals are to be read. Reading is effected with the same clock frequency as writing. The relevant control commands are again derived from the address circuit 10. The actual command for reading a digital television signal is again supplied by the synchronizing pulse generator 12 and is passed from an output 20 of the address circuit to a corresponding input 21 of the memory 8. The relevant control signal for reading the memory 8 is therefore again derived from the signal from oscillator 8, so that the relevant memory addresses are read every 200 nanoseconds. The memory is then read in between two write operations of the memory, i.e. every 100 nanoseconds after a preceding write operation. Therefore, a memory may be employed in the present embodiment which enables writing or reading of a storage location after approximately 100 nanoseconds. The memory addresses to be read are determined by a control signal appearing at the outputs 16 of the address circuit in a similar way as for writing, for which purpose the switch 15 is changed over by the synchronizing pulse generator 12, after which the corresponding control signals are applied to said outputs by a form of the address circuit to be described hereinafter. The digital television signals read from the addresses of the memory 8 reach the outputs 22 of said memory, from where they are applied to the inputs 23 of a digital-/analog converter 24, at whose output 25 the analog television signal which has been corrected for possible time base errors is available.

In order to enable time-base error correction the magnitude and sign of the relevant time base error should obviously be known. For this purpose a comparison signal is derived from the television signal in known manner, which signal may for example be constituted by the line synchronizing pulses of the television signal. This is obtained in a separator stage 26, to whose input 27 the television signal applied to the input 1 of the circuit arrangement is applied and at whose output 28 the line synchronizing pulses of the television signal are available, whose time sequence is indicative of the prevailing time base error. For determining the magnitude and the sign of the instantaneous time base error a detection circuit 29 is used, to whose input 30 the output signal of the separator stage 26 is applied. This detection circuit 29 comprises a phase discriminator 31, which in the usual manner determines the phase shift between consecutive line synchronizing pulses. For this purpose the embodiment includes a flywheel circuit which is generally referred to as phase-locked loop or briefly PLL circuit and which co-operates with a variable-frequency oscillator 32 which supplies the desired signal for the phase discriminator and which in the usual manner receives a control signal from the phase discriminator 31 via a low-pass filter 33. Thus, the phase discriminator 31, which receives the line synchronizing pulses at its input 34, provides an error signal which is proportional to the relevant time base error at its output 35, which error signal, depending on the choice of the phase discriminator, may be an analog or a digital signal. In the present embodiment it is assumed that an analog signal is available. This analog time-base error signal, whose amplitude is proportional to time intervals which are indicative of the time base error, is applied to the input 36 of a further analog/digital converter 37, so as to obtain a digital time-base error signal, which is then available at the outputs 38 of the converter which also constitute outputs of the detector circuit 29.

The digital time base error signals are evaluated at sampling instants which correspond to the rhythm of the line synchronizing pulses, for which purpose the line synchronizing pulses applied to the input 30 of the detector circuit 29 are also applied to a further input 39 of the converter 37. A more frequent sampling is not necessary in the present case, because the error is also determined in the rhythm of the line synchronizing pulses. Quantization of the amplitudes of the analog time base error signal for the formation of the time base error signals at the individual sampling instants is effected in units which correspond to a given time interval, which results in a corresponding number of bits. In the present example it is assumed that this time interval should be 200 nanoseconds. Therefore, this time interval is equal to the time interval which is defined by the clock frequency for writing the digital television signals into the addresses of the memory 8. The ratio of these two time intervals should always be an integer, in the present instance unity, in order that corresponding correction units can be assigned to the error units. Therefore, one error bit in the present example corresponds to a time delay by one address in the memory 8. Thus, the relationship between the digital time base error signal and the individual addresses in the memory 8 is established.

The digital time base error signals obtained in the afore-stated manner, which obviously are also representative of the sign of the time base error, are now applied from the outputs 38 of the detection circuit 29 to inputs 40 of the address circuit 10, so as to obtain control signals which define after what time delay in accordance with the relevant time base error the digital television signals which have been written into the individual addresses of the memory 8 are to be withdrawn therefrom. This is effected in such a way that, depending on the digital time base error signal which is obtained, that memory address to be read is selected which contains the digital television signal corresponding to the instant at which correction for the relevant time base error is obtained. Thus the time base error is corrected in a purely digital basis. The address circuit 10 therefore derives digital control signals from the digital time base error signals applied to this circuit, which control signals, as stated, are available at the outputs 13 of said circuit and which are applied to the inputs 7 of the memory 8, so that selection of the relevant addresses in the memory 9 is effected.

Thus, the control range for the correction of time base errors as regards the maximum magnitude is governed by the capacity in respect of the number of addresses of the memory 8, and as regards the minimum magnitude by the selected clock frequency for writing into the memory. In the present example the clock frequency corresponds to a time interval of 200 nanoseconds so that this is the smallest time base error that can be compensated for. When it is assumed that the memory 8 for example has a capacity of 1024 bits, the time base error of zero magnitude corresponding to half the storage capacity, a maximum control range for the time base error of $\pm 102.4$ $\mu$secs. is obtained, which corresponds to approximately $\pm 1.5$ lines of the television signal.

If there is no time-base error, those addresses of the memory 8 are read at the clock frequency, which always correspond to half the storage capacity in conformity with the operation of writing the digital television signal into the memory. However, if the detection circuit 29 detects a time base error, an address of the memory 8 is read which is situated before or after the address corresponding to half the storage capacity in accordance with the magnitude and sign of the error. Such an address is determined by the address circuit 10, simply in accordance with the computation rule:

$$X_A = S_A - (K/2 \pm F)$$

where $X_A$ is the desired address, $S_A$ the last address in which a digital television signal was entered, K the capacity of the memory, and F the relevant digital time base error. This computation can be performed in the address circuit 10 in a variety of manners, for example with the aid of adding circuits or of a reversible counter and the like. In the present example two adding circuits 41 and 42 are included for this purpose. Via the inputs 40 of the address circuit the digital time base error signals are applied to the adding circuit 41 and via inputs 43 a constant digital signal corresponding to half the storage capacity, which signal is obtained from a read-only memory 90, and are combined in said adding circuit in accordance with their magnitude and sign. The signals appearing at the outputs 44 of the adding circuit 41 are applied to the inputs 45 of the adding circuit 42, to whose further inputs 46 the signals appearing at the outputs 14 of the counter 13 are applied, which signals define the address of the memory 8 in which for the last time a digital television signal was entered. These signals applied to the adding circuit 42 are also combined therein in conformity with their magnitude and sign, so that in accordance with the afore-mentioned computation rule control signals are obtained at the outputs 47 of this adding circuit 42, which control signals identify the desired address of the memory 8 in which the digital television signal which has been corrected in respect of the relevant time base error is contained. During each read operation these outputs 47 are connected to the outputs 16 of the address circuit via the switch 15, from where the control signals are applied to the inputs 17 of the memory 8.

As is apparent from the foregoing, such a circuit arrangement in particular enables larger time base errors to be compensated for, exclusively on a digital basis, so that no tolerance and drift effects occur, in contradistinction to circuit arrangements in which the time base error signal is processed on an analog basis. Moreover, the residual error is always constant, because it only depends on the selected clock frequency and not on the quality of the control circuit, its loop gain etc., so that no variable fluctuations in the position of the picture occur as a result of the residual error. The magnitude of the maximum control range is then determined, as previously stated, by the capacity of the memory and the selected clock frequency. Of course, such a circuit arrangement enables time base errors of both black-and-white and colour television signals to be corrected.

Figure 2:
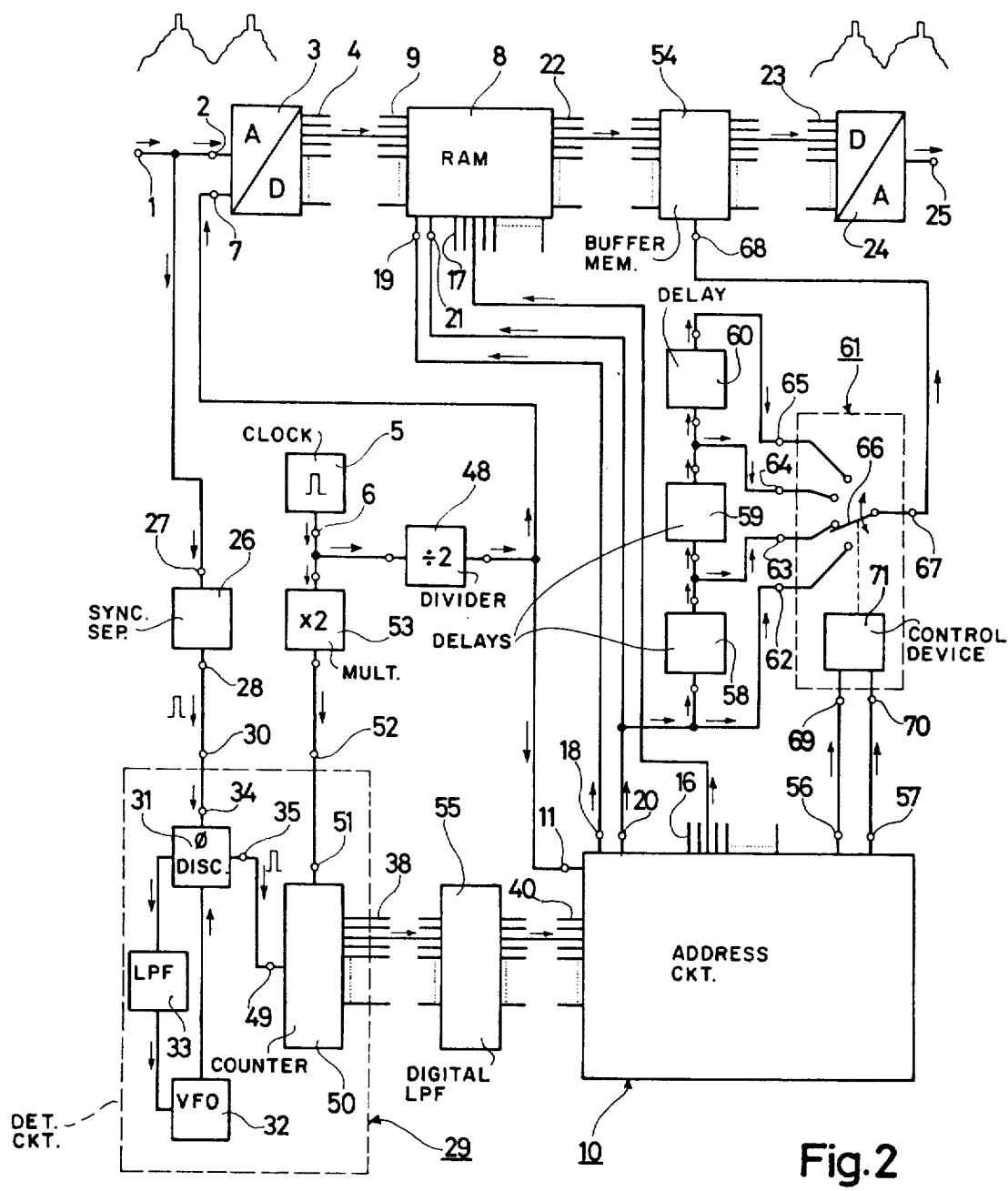
FIG. 2 is a modification of the circuit arrangement of FIG. 1, the digital time base error signals being quantized in accordance with a time interval which is smaller than the time interval with which the digital television signals follow each other in accordance with the clock frequency.

In the embodiment of FIG. 2 the television signal applied to the input 1 and afflicted with time base errors is again converted into a digital signal in an analog/digital converter 3, which from the outputs 4 of the converter is applied to the inputs 9 of the random access memory 8 (RAM). Again, a similar signal with a clock frequency of 5 MHz is used as control signal for determining the sampling instants of the television signal which is applied to the input 7 of the analog to digital converter, so that every 200 nanoseconds a digital television signal is available which is to be transferred to the memory 8. This control signal is supplied by a divider stage 48 to which the signal from the oscillator 5 is applied. In this case the oscillator 5 generates a signal with a clock frequency of 10 MHz, which is halved in the divider stage 48, so that the 5 MHz clock frequency is obtained. This clock frequency also reaches the input 11 of the address circuit 10, which is of a similar design as in the embodiment of FIG. 1 and which ensures that the digital television signals are written into the appropriate addresses of the memory 8 in a 200 nanosecond rhythm. This is again effected with the aid of control signals which are applied from the inputs 16 and 18 of the address circuit to the inputs 17 and 19 of the memory 8.

The magnitude and sign of the time base error are determined with the aid of a detection circuit 29, to whose input 30 the line synchronizing pulses are applied which have been separated from the television signal with a separator circuit 26. In the present example it is assumed that the phase discriminator 31 in the detection circuit directly produces a pulse-shaped time base error signal at its output 35, the instantaneous pulse width being representative of the relevant time base error. For the formation of a quantized digital time base error signal this output signal of the phase discriminator is applied to the control input 49 of a counter 50, to whose count input 51, which is connected to a further input 52 of the detection circuit, a pulse-shaped clock signal is applied, whose pulses are counted by the counter during the time interval in which a time-base error signal appears at its control input 49. Thus, the desired digital time base error signals in the form of a number of bits are available at the counter outputs, which also constitute the outputs 38 of the detection circuit.

In the present example quantization of the pulse-shaped time base error signals for the formation of the digital time base error signals is effected in units which correspond to a time interval which is defined by the clock frequency which is applied to the counter. This time interval is selected to equal 50 nanoseconds, which corresponds to a clock frequency of 20 MHz. The relevant clock signal is derived from the oscillator 5, by applying the output signal of said oscillator to a frequency doubler stage 53, whose output signal in its turn is applied to the input 52 of the detection circuit. Also in this case the requirement is met that the ratio of the 200 nanosecond time interval, which is defined by the clock frequency, for writing the digital television signals into the address of the memory 8, to the 50 nanosecond time interval for the formation of the digital time base error signals is an integer, so as to allow corresponding correction units to be assigned to the error units. In the present case the first-mentioned time interval is the quadruple of the second time interval, which means that the time base error is determined in units which are smaller than the corresponding correction units in the memory 8.

For this reason the present embodiment incorporates a buffer memory 54 which is included between the outputs 22 of the memory 8 and the inputs 23 of the digital/analog converter 24, in which buffer memory the digital television signal which has been read from the relevant address of the memory 8 can temporarily be stored for a certain time before it is fed to the digital-/analog converter 24. This time may be 0, 50, 100 or 150 nanoseconds, i.e. it can be selected in steps of 50 nanosecs. in accordance with the time interval for the formation of the digital time base error signal, on which it also depends which time interval is to be used. After 200 nanoseconds the next digital television signal is transferred from the relevant address of the memory 8 to the buffer memory 42.

Read-out of the addresses of the memory 8 in accordance with the prevailing time base error is again controlled with the aid of the address circuit 10 in the same way as in the example of FIG. 1. For this purpose the digital time base error signals are again applied to the address circuit 10, but in this case a digital low-pass filter 55 is included between the outputs 38 of the detection circuit and the corresponding inputs 40 of the address circuit, which filter removes low-frequency interference and noise components from the time base error signal, which specifically has a favourable effect on the accuracy of the time base error correction. For the selection of the relevant addresses in the memory 8 the address circuit on the basis of the more significant bits determines how many full 200 nanosecond time intervals are contained in the digital time base error signal, which results in address selection. The relevant control signals again appear at the outputs 16 of the address circuit and the actual read command at the output 20 of the address circuit which output is connected to the input 21 of the memory 8.

For the evaluation of the digital time base error signals the address circuit furthermore on the basis of the less significant bits thereof, in the present example the two last bits, determines the number of 50 nanosecond time intervals contained in the digital time base error signals which are in excess of the number of 200 nanosecond time intervals contained in the digital time error signals. The relevant control signals appear at the further outputs 56 and 57 of the address circuit. The number of these excess 50 nanosecond time intervals determines how long a digital television signal which has been read from an address of the memory 8 is to be stored in the buffer memory 54.

For the formation of the relevant control commands for the buffer memory 54 there are provided three delay stages 58, 59 and 60 each with a delay of 50 nanoseconds, as well as a switching device 61. The switching device 61 has four inputs 62, 63, 64 and 65, to which input 62 the control signal which appears at the output 20 of the address circuit 10 and determines a read operation in the memory 8 is applied directly, to the input 63 via the delay stage 58, to the input 64 via the delay stages 58 and 59, and finally to the input 65 via all three delay stages 58, 59 and 60. Depending in the position of a selection switch 66 of the switching device 61, which switch co-operates with one of the inputs 62, 63, 64 and 65, one of these control signals is applied to the output 67 thereof, from where it is supplied to an input 68 of the buffer memory 54, causing said memory to be read, i.e. directly, or after 50, 100 or 150 nanoseconds. The digital television signal which has been read from the buffer memory 54 is then re-converted into an analog television signal in the digital/analog converter 24.

The selector switch 66 is set to one of its four positions depending on the digital time base error signals, for which use is made of the fine evaluation of the error. The relevant control signals, as stated, are available at the outputs 56 and 57 of the address circuit 10, which are connected to corresponding inputs 69 and 70 of the switching device 61, which lead to a control device 71, which actuates the selector switch 66, which may of course be an electronic switch, accordingly.

When the time base error is zero, those addresses are read from the memory 8, as has been described for the example of FIG. 1, which in conformity with the manner in which the digital television signal has been written into the memory, always correspond to half the storage capacity. These signals are transferred to the buffer memory 54 and immediately read from this memory, because in this case the selector switch 66 of the switching device 61 is connected to the input 62 thereof and consequently the read control signal from the output 20 of the address circuit 10 reaches the buffer memory 54 without delay. When the time base error is less than 200 nanoseconds, for example 55 nanoseconds, the addresses corresponding to half the storage capacity of the memory 8 are read and the relevant digital television signals are consecutively transferred to the buffer memory 54, but are not read from this memory until after 50 nanoseconds, because in this case the selector switch 66 of the switching device 61 is connected to the input 63 thereof, where the read control signal from the output 20 of the address circuit 10 does not arrive until it has passed through the delay means 58, i.e. after 50 nanoseconds. The same applies to those cases in which the time base error is greater than 200 nanoseconds the addresses in multiples of 200 nanoseconds corresponding to this error being read and the buffer memory 54 providing a delay corresponding to any excess 50 nanosecond components contained in the error.

Thus, it is possible in the present embodiment, using a memory 8 in a similar way as in the embodiment of FIG. 1, to compensate for time base errors up to 50 nanoseconds. In practice the step of selecting the time interval which is determined by the clock frequency for writing the digital television signal into the memory 8, four times greater than the time interval for the formation of the digital time base error signals, is found to be particularly advantageous in respect of the necessary operations and the results achieved thereby. When a different multiple is chosen the situation changes accordingly.

Figure 3:
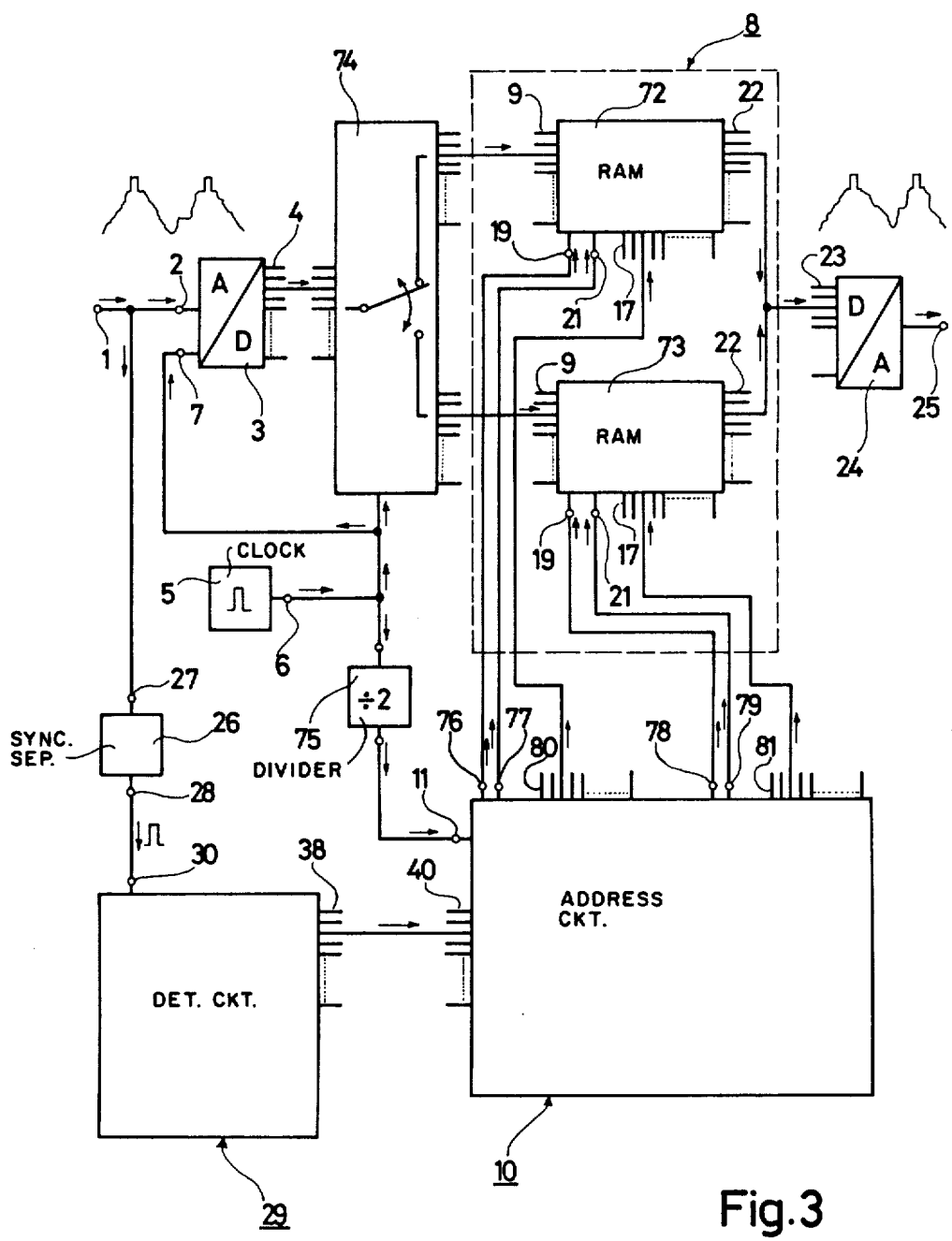
FIG. 3 shows another modification of the circuit arrangement of FIG. 1, employing two random access memories operating in the multiplex mode.

The circuit arrangement of FIG. 3 is of the same design as that of FIG. 1, but the memory device 8 has been replaced by two random access memories 72 and 73 (RAM) which operate in the multiplex mode. Thus, it is possible to operate the two memories 72 and 73 each with half the clock frequency used for the analog/digital converter 3, so that memories can be used which are substantially cheaper. To realize the multiplex mode there is provided an electronic switch 74 after the converter 3, which under control of the clock frequency of the converter 3 alternately applies the digital television signals supplied by this converter to the inputs 9 of the two memories 72 and 73. The outputs 22 of the two memories 72 and 73 are combined and lead to the inputs 23 of the digital/analog converter 24. The clock frequency for the address circuit 10 for the formation of control signals for writing the digital television signals into the addresses of the memories 72 and 73 and for reading the digital television signals from the relevant addresses of the two memories is obtained with the aid of a divider stage 75, which halves the clock frequency for the converter 3, because owing to their multiplex mode the two memories operate with the half the clock frequency of the converter 3. As in this embodiment the address circuit 10 must control the two memories 72 and 73 in the multiplex mode, it comprises two groups of control inputs for realizing the write and read operations and for the selection of the corresponding addresses to be written or read, which are designated 76, 77; 78, 79; and 80, 81 and which are respectively connected to the inputs 19, 21 and 17 of the two memories. The operation of this circuit arrangement is identical to the operation of the arrangement of FIG. 1 except that the addresses to be selected on the basis of the relevant time base error are located in the memory 72 or in the memory 73, depending on the fact in which of the two memories the relevant digital television signal has been written owing to the multiplex mode.

What is claimed is:

1. A circuit arrangement for the digital correction of time base errors of a television signal, said circuit comprising an analog to digital converter for converting said television signal into digital television signals with a specific clock frequency, a random access memory device with a given number of addresses coupled to said converter, a digital to analog converter coupled to said memory for reconverting said digital signals into an analog television signal, an address circuit coupled to the memory device for writing the digital television signals into the addresses of the memory device with the clock frequency and for reading at times in between the times of said writing the memory device addresses with the clock frequency, the addresses that are read being selected in accordance with the magnitude and sign of the time base error; an identification circuit for determining the time base error comprising a phase discriminator to which a comparison signal derived from the television signal is applied, said comparison signal being compared with a desired signal; said identification circuit having output means for supplying digital time base error output signals which occur at a given time interval, the ratio of the time interval which is defined by the clock frequency to the given time interval for the formation of the digital time base error signals being an integer, said output means being coupled to the address circuit for controlling the selection of the memory device addresses to be read depending on the number of time intervals contained in the digital time base error signals and defined by the clock frequency with respect to the number of memory device addresses.

2. A circuit arrangement as claimed in claim 1, wherein the time interval defined by the clock frequency is an integral multiple of the given time interval for the formation of the digital time base error signals, and further comprising a buffer memory coupled to the output of the random access memory, said buffer memory having input means for receiving the digital television signal which has been read from an address of the memory device, said digital television signal remaining stored for a certain time, said certain time being determined by the number of given time intervals contained in the digital time base error signals in excess of the time intervals defined by the clock frequency.

3. A circuit arrangement as claimed in claim 1, further comprising a digital low-pass filter coupled between said indentification circuit and said address circuit.

4. A circuit arrangement as claimed in any of the preceding claims, wherein the memory device comprises at least two random access memories which operate in the multiplex mode, consecutive digital television signals being alternately written into one of the memories of the memory device.

5. A circuit arrangement as claimed in claim 2, wherein said integral multiple is four.

* * * * *